Patented Aug. 26, 1941

2,253,811

UNITED STATES PATENT OFFICE 2,253,811

SUBSTITUTED HYDROXYAROMATIC ACIDS

Orland M. Reiff, Woodbury, N. J., assignor to Socony-Vacuum Oil Company, Incorporated, New York, N. Y., a corporation of New York No Drawing. Application November 10, 1938, Serial No. 239,771

10 Claims. (Cl. 260—521)

This invention relates to the production of certain new chemical compounds or compositions which may be generally designated as wax-substituted hydroxyaromatic carboxylic acids. Although the invention is broadly concerned with chemical compounds or compositions coming within the above-designated general classification, it contemplates as a preferred group within such general classification those compounds or compositions which are soluble or miscible with mineral oil.

My invention is based upon the discovery that the oil-miscible wax-substituted hydroxyaromatic carboxylic acids are of multifunctional activity when blended with viscous mineral oil fractions in that they effect improvement of several unrelated and related properties of the oil. For example, this preferred oil-miscible group of compounds or compositions coming within the general field of invention contemplated herein are effective, when blended in a minor proportion with mineral oil fractions of the lubricant type, to depress the pour point, improve the viscosity index (V. I.) and inhibit oxidation of the oil. By inhibiting oxidation these oil-miscible acids act to retard the formation of those carbonaceous deposits which normally cause the sticking of piston rings and the closure of the slotted oil rings in internal combustion engines. Thus any one of these preferred oil-miscible compounds or compositions may, for example, be used in internal combustion engine lubricants to retard or prevent the sticking of piston rings, and at the same time it will act to depress the pour point and improve the viscosity index of the oil.

It should be understood that the use of these preferred oil-miscible compounds or compositions is not confined to lubricating oils, but they may be employed in any mineral oil fractions where one or more of the improved properties recited above is desired.

It is also to be understood that while my invention contemplates oil-miscible compounds or compositions of the type above referred to as a preferred class or group within the general field of invention, the invention is not limited to such oil-miscible compounds or compositions, since this whole class of new materials is possessed of valuable properties irrespective of oil-miscibility. For example, these compounds or compositions may be used as such as oil-soluble resins for use in paints and varnishes or as intermediaries in the production of resins, resin-like materials, rubber substitutes, etc.

Numerous other uses and applications of the compounds or compositions contemplated herein will be readily apparent to those skilled in the art from the following description of their compositions and preferred methods of synthesis.

As has been previously pointed out, the compounds or compositions contemplated by this invention may be broadly designated as wax-substituted hydroxyaromatic carboxylic acids. All of the organic acids contemplated by this invention are characterized by the presence of an aromatic nucleus in which at least one nuclear hydrogen is substituted with an hydroxyl group and at least one nuclear hydrogen is substituted with a carboxyl group. This characterizing group may be represented by the formula:

I. $\quad T'(OH)(COOH)$ in which $T'$ represents an aromatic nucleus; (OH) represents at least one hydroxyl group attached to the nucleus $T'$; and COOH represents at least one carboxyl group attached to the nucleus $T'$.

The compounds or compositions contemplated by this invention are further characterized by the fact that at least one replaceable hydrogen on the aromatic nucleus is replaced with an aliphatic hydrocarbon radical or group characteristic of an aliphatic hydrocarbon of high molecular weight which I may term a heavy alkyl group. For obtaining the preferred group of compounds or compositions which are miscible with mineral oil and which possess the multifunctional oil-improving properties, I have found that this "heavy alkyl" substituent in the substituted hydroxyaromatic acids under discussion must be derived from a predominantly straight chain aliphatic hydrocarbon of at least twenty carbon atoms such as characterize crystalline petroleum wax. As a matter of fact, petroleum wax is considered to be a preferred source of the "heavy alkyl" substituent, and it is for that reason that the compounds or compositions described herein are referred to as "wax"-substituted. It is to be understood, however, that the term "wax" as used herein is applied in a broad sense and is intended to include any pure compound or mixture of compounds predominantly aliphatic in nature and containing at least twenty carbon atoms which is susceptible of attachment to an aromatic nucleus to provide a substituent which, in the proper proportions, will impart to the characterizing group typified by Formula I above the multi-functional oil-improving properties referred to.

The simplest type of compound or composition characteristic of the present invention may be represented by the formula:

II.  $\quad R(T(OH)(COOH))$ in which R represents at least one aliphatic hydrocarbon radical or group containing at least twenty carbon atoms (heavy alkyl group) which is attached to a mono- or poly-cyclic aromatic nucleus T and in which (OH) and (COOH) are as indicated above. In the preferred group of compounds or compositions contemplated herein, which are oil-miscible and which by virtue of their heavy alkyl (wax) substituent have multi-functional properties in mineral oil blends, it is important that the heavy alkyl (wax) substituent R comprise a substantial proportion of the composition or compound as a whole. This will be discussed in detail later in the specification.

In addition to the heavy alkyl (wax) substituent R the compounds or compositions contemplated herein, as represented by Formula I above, may have additional nuclear hydrogen replaced with other substituents which in the case of the preferred oil-miscible compositions may or may not have a solubilizing effect upon the composition as a whole. Such a compound in its simplest form may be represented by the formula:

III.  $\quad R(T(OH)(COOH)Y)$ in which R, T, (OH) and (COOH) have the same significance indicated above and in which Y represents residual hydrogen which may be replaced by a radical selected from the group consisting of: aliphatic hydrocarbon groups having less than twenty carbon atoms, alkoxy, aroxy, aralkyl, alkaryl, chlorine, nitro, and amino radicals or groups. Compounds of the above general formula-type having mono-, di-, and tri-cyclic nuclei are illustrated by the following specific formulae:

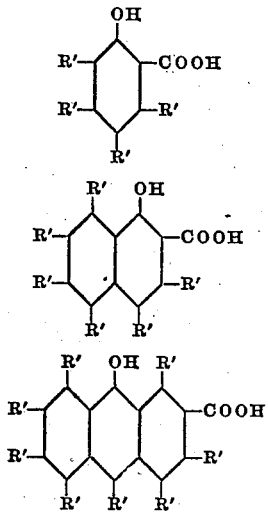

in which at least one of the R's represents an aliphatic radical or group containing at least twenty carbon atoms and in which the remaining R's represent residual hydrogen which may be replaced with: aliphatic groups containing less than twenty carbon atoms, hydroxy, carboxy, alkoxy, aroxy, alkaryl, aralkyl, aryl, chlorine, nitro, and amino radicals or groups.

In the foregoing examples it will be observed that the so-called heavy alkyl substituent R is a monovalent aliphatic hydrocarbon group; but, as will appear from the hereinafter described synthesis of the wax-substituted phenolic compounds from which the salts contemplated herein are derived, part or all of the substituent derived from high molecular weight aliphatic hydrocarbon materials may be comprised of polyvalent radicals or groups in which the several valence bonds form attachment with separate aromatic nuclear groups. Compounds of this type are included under the following general formula representation:

IV.  $\quad R^v(T(OH)(COOH)Y_b)_n$ in which T, (OH) and (COOH) have the same signficance indicated above; $R^v$ represents at least one aliphatic or alkyl ("wax") radical or group containing at least twenty carbon atoms, such alkyl group or groups being attached by one valence bond only to at least one aromatic nucleus T; $v$ represents the valence of the heavy or high molecular weight aliphatic radical $R^v$, which in the case of preferred oil-miscible compounds contemplated herein may be varied from one to four and which in the case of compounds wherein oil-miscibility is not an essential factor may be a number greater than four; $Y_b$ represents a monovalent aryl radical or group selected from the class identified above in connection with Y; $b$ represents the number of Y's and is equal to zero or a whole number corresponding to the valence bonds on the nucleus T not satisfied with $R^v$, (OH) and (COOH); and $n$ indicates the total number of groups $(T(OH)(COOH)Y_b)$ present in the molecule represented by the formula and attached to the heavy alkyl ("wax") group or groups represented by $R^v$ through the valences $v$. In the case of the preferred oil-miscible wax-substituted hydroxy-aromatic acids $n$ represents a whole number of from one to four; but, as stated above, where oil-miscibility is not an essential feature of the composition, $n$ may represent a number greater than four corresponding to the valences on $R^v$ which are satisfied by the aryl nuclei T.

Considering the foregoing general formula representation IV in connection with the preferred oil-miscible compounds or compositions contemplated herein wherein $v$ and $n$ represent whole numbers from one to four, it will be seen that the compounds represented by general Formula IV include those materials in which all of the heavy alkyl (wax) substituent is monovalent ($v=1$ and $n=1$) or in which all of this substituent is polyvalent ($v$ and $n$ being equal to two, three, or four): or since $R^v$ is defined as being at least one aliphatic radical or group containing at least twenty carbon atoms and may, therefore, include several such groups, it will be seen that this general Formula IV is inclusive of compounds having "wax" groups or radicals of different valences (from one to four) in the same molecule. Also, it will be observed that since $n$ may be any whole number from one to four, the number of aromatic nuclei T in the molecule may likewise vary from one to four. It will be seen, therefore, that the relationship between $n$ and $v$ in Formula IV in its broadest aspect is such that when $n$ is equal to one, $v$ is equal to one, and when $n$ is greater than one, the valences of at least one of the $R^v$'s is equal to $n$ (in order to tie the several nuclei or T's together), the valences of any remaining $R^v$'s being any whole number equal to or less than $n$.

Compounds of the general type coming under Formula IV which contain both monovalent and polyvalent heavy alkyl ("wax") substituents having at least twenty carbon atoms are included under the following subgeneric formula representation:

V.   $R^{v'}(T(OH)(COOH)Y_{b'}R_c)_{n'}$ in which T, (OH) and (COOH) have the same significance as indicated above; $R^v$ represents at least one polyvalent aliphatic radical or group containing at least twenty carbon atoms and having a valence $v'$ in the case of the preferred oil-miscible compounds or compositions of two, three or four; $Y_{b'}$ indicates the same group of substituents as described above for Y; $R_c$ represents monovalent aliphatic radicals or groups containing at least twenty carbon atoms; $b'$ represents the number of $Y_{b'}$'s and is equal to zero or a whole number corresponding to the valence bonds on the nucleus T not satisfied with $R^{v'}$, (OH), (COOH) and $R_c$; and $n$ represents a whole number which in the case of the preferred oil-miscible compounds or compositions varies from two to four and which indicates the total number of the groups $(T(OH)(COOH)Y_{b'}R_c)$ present in the molecule represented by the formula which are attached to the heavy alkyl group or groups represented by $R^{v'}$ through the valences $v'$.

In the above general Formulae IV and V it will be understood that since heavy alkyl or "wax" groups $R^v$ and $R^{v'}$ are aliphatic hydrocarbon radicals of the chain type and are each attached by one valence bond only to each corresponding aromatic nucleus, the valence $v$ or $v'$ of such radical or radicals is of necessity never greater than the number $n$, which indicates the number of aromatic nuclei in the molecule and in Formula IV is always equal to one when $n$ equals one. Otherwise an $R^v$ or an $R^{v'}$ having a valence greater than the number ($n$ or $n'$) of aromatic nuclei would either have some of its valences unsatisfied or else would form a condensed ring or rings by attachment at two or more points to one and the same aromatic nucleus. Such latter compounds, as already indicated from the definition of $R^v$ or $R^{v'}$, are not considered as characterizing the product of the present invention although probably formed in some instances in minor amounts as unobjectionable by-products by certain of the methods of preparation herein disclosed.

A simple type of compound coming under general Formula IV in which $v$ and $n$ is each equal to one and in which there is only one so-called high molecular weight aliphatic or heavy alkyl (wax) group $R^v$ may be illustrated by the following formula showing T for purposes of illustration as a monocyclic nucleus:

A. 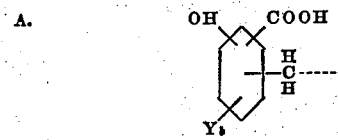

In the above formula the chain represents the heavy alkyl or wax substituent ($R^v$) containing at least twenty carbon atoms, and $Y_b$, (OH) and (COOH) have the same significance as has been heretofore given to these groups.

Since group $R^v$ has been defined as "at least one," it will be apparent that there may be more than one heavy alkyl substituent attached to the nucleus T. Such a compound, where $v$ and $n$ are each one and in which there are two such monovalent $R^v$ groups, may be represented by the following formula:

B. 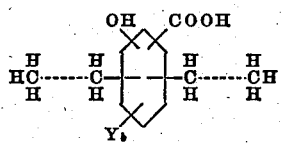

in which the chains and the substituent characters have the same significance defined above.

Compounds of the type satisfying the general Formula IV and the subgeneric Formula V in which $R^v$ (or $R^{v'}$) is polyvalent and $v$ (or $v'$) and $n$ (or $n'$) are more than one and in which there is only one such polyvalent $R^v$ group may be illustrated by the following formula, in which the aryl nucleus T is again indicated for illustration as being monocyclic:

C. 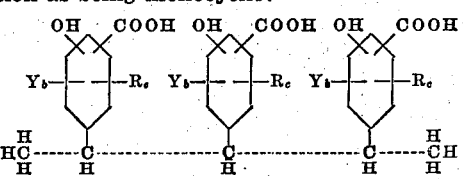

In the above Formula C, $R_c$ is a monovalent heavy alkyl (wax) group as defined above under Formula V and is the same as monovalent $R^v$ in Formula IV.

Under this same type of compound indicated by Formula C there may also be more than one polyvalent $R^v$ group (represented by the chain), such a compound in which there are, for example, two polyvalent $R^v$ groups being illustrated by the following formula, in which the characterizing groups have the same significance described above under Formula C.

D. 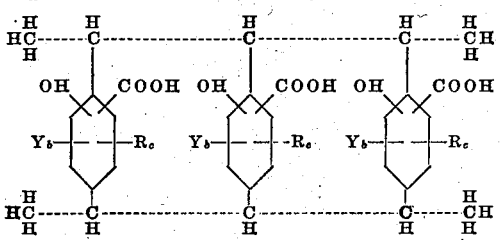

The possible molecular structure of compounds in which the aryl nucleus T is polycyclic will be obvious from the foregoing exemplary Formulae A to D inclusive, and the possible molecular structure of compounds in which $v$ and $n$ are equal to two and four will be readily understood from the exemplary Formulae C and D.

Another possible molecular structure of compounds coming under general Formula IV is a compound having more than one polyvalent $R^v$, at least two of which have different valences. Such a compound may be typified by the following formula in which the symbols have the same significance as in Formula C:

E. 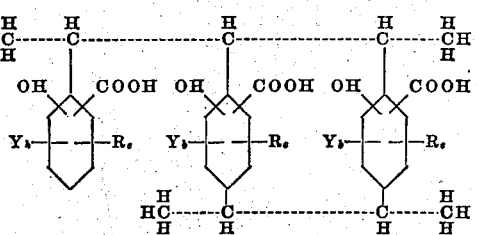

As to the possible number of $R^v$ (and $R_c$)

groups going to make up a single molecule, this will vary with the extent to which it is desired to effect substitution of the nucleus with aliphatic groups containing at least twenty carbon atoms (heavy alkyl or "wax" groups), such as those derived from petroleum wax, for obtaining the desired properties in the product and is, of course, limited by the number of replaceable hydrogens on the aromatic nucleus which are available for substitution. As will be apparent to those skilled in the art, the maximum possible number of $R^v$ (and $R_c$) groups which can be attached to a single aromatic nucleus will vary as the nucleus is mono- or poly-cyclic and also as the nucleus is otherwise substituted. It will also be apparent that available valence bonds on the nuclei may all be attached to polyvalent aliphatic substituents.

It will be understood that the oil-improving agents contemplated by this invention may be pure compounds satisfying the general Formula IV described above with any one of the various mono- and poly- cyclic aromatic nuclei as T and the various substituents $R^v$ (or $R^v$ and Y) described, the only requisites being that at least one nuclear hydrogen be substituted with a hydroxyl group, at last one nuclear hydrogen be substituted with a (COOH) group, and at least one nuclear hydrogen be substituted with an aliphatic radical or group containing at least twenty carbon atoms, such as a radical or group derived from petroleum wax. However, in manufacturing the preferred composition of the present invention by the preferred method of procedure, as will appear more fully later on, the final product obtained is normally or usually a mixture of different compounds corresponding to different values of $n$ and $v$ and to different numbers of aliphatic groups $R^v$.

As has been previously pointed out, it is important that the wax-substituted hydroxyaromatic carboxylic acids preferred for use as oil-improving agents and represented by general Formulae IV and V in which $n$ and $v$ vary from one to four have nuclear hydrogen in the aromatic nucleus T substituted with aliphatic hydrocarbon material containing at least twenty carbon atoms, such as is derived from petroleum wax, to an extent such that this heavy alkyl substituent comprises a sufficient proportion of the composition as a whole to render the same miscible with the mineral oil fraction in which the improving agent is used so as to form a mineral oil solution or colloidal suspension which will remain stable as such under normal conditions of handling and use. It appears from the results of my research that there is a critical range in the degree of "wax"-substitution of the compounds or compositions contemplated hereinbelow which the wax-substituted hydroxyaromatic acids will not satisfy the requirements for oil-miscibility. Expressing this in another way, it appears that the hydroxyaromatic constituent should not exceed a certain percentage of the wax-substituted composition as a whole. This critical range of wax-substitution may be roughly expressed as the ratio by weight of $(T(OH))_n$ to $R^v(T(OH))_n$.

The degree of wax-substitution and the critical range within which preferred oil-miscible "wax"-substituted hydroxyaromatic acids can be obtained may also be expressed as the number of carbon atoms contained in the aliphatic substituents for each aryl nucleus in a given molecule or molecular structure.

The critical range in the degree of wax-substitution of the aryl nucleus in the improving agents contemplated herein may vary with: (a) the mineral oil fraction in which the improving agent is to be used; (b) the aryl nucleus T (mono or poly- cyclic); (c) the hydroxyl content of the aryl nucleus (mono- or poly- hydric); (d) mono- or poly-substitution of the aryl nucleus; and (e) other substituents on the nucleus T, which may be of positive or negative or of neutral mineral oil-solubilizing activity.

In general it may be said that a polycyclic nucleus appears to require a higher degree of wax-substitution than a monocyclic nucleus and that a polyhydric nucleus requires a higher degree of wax-substitution than a monohydric nucleus.

In view of the foregoing variables it would be impracticable and probably misleading to attempt to give an expression and figure which would indicate accurately the proper ratio of hydroxyaromatic constituent to the alkylated hydroxyaromatic constituent which would express a degree of aliphatic substitution for the preferred substituted hydroxyaromatic acids that would satisfy all cases taking these variables into account. As a guide for preparing these improving agents, however, my research indicates that for a compound or composition of the preferred oil-miscible type having the multifunctional mineral oil-improving properties hereinabove referred to, the ratio, expressed as:

$$\text{VI.} \quad \frac{(T(OH))_n}{R^v(T(OH))_n}$$

should not be greater than .20 when the weight of the hydroxyaromatic nucleus or component $(T(OH))_n$ is expressed in terms of its chemically equivalent weight of phenol ($C_6H_5OH$). In general it may be said that in the preferred substituted hydroxyaromatic acids contemplated herein the ratio by weight of the hydroxyaromatic component in the product to the corresponding wax-substituted hydroxyaromatic nucleus or component therein should not be greater than about twenty parts by weight of the former to about 100 parts by weight of the latter, or about twenty per cent, when the weight of the hydroxyaromatic nucleus or component is expressed in terms of its chemically equivalent weight of phenol. It will be observed that the ratio as represented by the Formula VI does not take into account any other substituent in the nucleus than the wax or heavy alkyl substituents (having at least twenty carbon atoms) and the hydroxyl group; but since the heavy alkyl substituent is primarily relied upon as the oil-solubilizing substituent in the preferred substituted hydroxyaromatic acids contemplated herein as multifunctional oil-improving agents, it is believed that the foregoing expression and limits will serve as a working guide for the preparation of these preferred compounds or compositions.

Also, as stated above, the degree of substitution with high molecular weight aliphatic groups may for these preferred oil-miscible compositions be expressed by the number of carbon atoms contained in the aliphatic substituent for a given hydroxyaromatic nucleus T. As a general guide here it may be said that the aliphatic substituents of at least twenty carbon atoms represented by $R^v$ in the above general Formula IV should, for the preferred materials contemplated herein, contain at least twenty-five carbon atoms for each aromatic nucleus T.

The ratio of twenty per cent, which I may term the "phenolic ratio," represents what I consider a maximum figure for the preferred oil-miscible products contemplated herein, and in general it will be found that this figure will be lower, the actual ratio, of course, being dependent upon the variable factors enumerated above. For example, as will appear later, an oil-miscible compound or composition satisfying the general Formula IV above, in which the substituent $R^v$ was derived from petroleum wax predominantly comprised of straight chain aliphatic hydrocarbon material of at least twenty carbon atoms and in which the aromatic nucleus was derived from phenol otherwise unsubstituted, should have a phenolic ratio as expressed above not substantially greater than about sixteen per cent.

A further general guide for the synthesis of preferred improving agents for viscous oils is to wax-substitute the aromatic nucleus so that it is polysubstituted with wax or heavy alkyl hydrocarbon radicals or groups.

The preferred procedure whereby the wax-substituted hydroxyaromatic carboxylic acids contemplated herein can be prepared may be broadly described as involving the steps of first substituting the hydroxyl hydrogen in a wax-substituted hydroxyaromatic compound with an alkali or alkaline earth metal to form a wax-substituted or "heavy alkyl"-substituted aryl metal oxide of the corresponding alkali or alkaline earth metal. Such alkali or alkaline earth metal oxide is then carboxylated to form the alkali or alkaline earth metal salt of the wax-substituted hydroxyaromatic-carboxylic acid, such reactions being indicated by the following general equation:

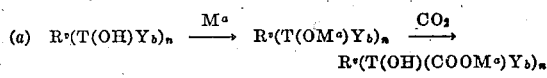

in which $M^a$ indicates an alkali or alkaline earth metal, and the remaining characters have the same significance described above in connection with the general Formula IV.

The alkali and alkaline earth metal salts may then be reacted with a suitable mineral acid such as hydrochloric acid to form the substituted hydroxyaromatic acid and a salt of the mineral acid which can be removed from the product by a suitable separation step. This reaction is illustrated by the following equation:

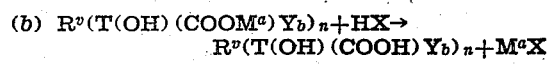

in which HX indicates the mineral acid.

The reactions described and illustrated above, the details of which will be further discussed in specific examples, have shown a "wax" (heavy alkyl)-substituted hydroxyaromatic compound as the starting material. Compounds of this nature, which satisfy the requirements of high alkylation for the preferred improving agents discussed above, or mixtures of such compounds, can be readily prepared by substituting a mono- or poly-hydric, mono- or poly-cyclic, substituted or unsubstituted hydroxyaromatic compound with pure aliphatic compounds containing at least twenty carbon atoms or with organic materials, such as petroleum wax, predominantly comprised of aliphatic hydrocarbons having at least twenty carbon atoms.

The starting material for the hydroxyaromatic constituent in the alkylation reaction to obtain a wax-substituted hydroxyaromatic product $R^v(T(OH)Y_b)_n$, in which $Y_b$, if present, is residual hydrogen, may be a mono- or poly-cyclic hydroxyaromatic compound otherwise unsubstituted; or in certain special cases (to be hereinafter described) the starting material may be an alkyl-aryl ether or an aralkyl-aryl ether. For obtaining an alkylated hydroxyaromatic product containing a "Y" substituent in addition to, or in place of, residual hydrogen, the starting material for the hydroxyaromatic constituent may be a mono- or poly-cyclic hydroxyaromatic compound in which part of the nuclear hydrogen is substituted with a member or members of the group consisting of: alkyl groups containing less than twenty carbon atoms, chlorine, hydroxy, alkoxy, aroxy, aryl, alkaryl, and aralkyl groups.

Examples of the hydroxyaromatic compounds which may be used as the starting material for the alkylation reaction are: phenol, resorcinol, hydroquinone, catechol, cresol, xylenol, hydroxydiphenyl, benzylphenol, phenyl-ethyl-phenol, phenol resins, methyl-hydroxydiphenyl, alpha and beta naphthol, alpha and beta methyl naphthol, tolyl naphthol, xylyl naphthol, benzyl naphthol, anthranol, phenyl methyl naphthol, phenanthrol, monomethyl ether of catechol, diphenyl ether, anisole, beta naphthyl methyl ether, chlorphenol, and the like. Preference in general is to the monohydroxy phenols otherwise unsubstituted, particular preference being given to phenol and alpha and beta naphthol.

The alkylation of the hydroxyaromatic compound with aliphatic hydrocarbon groups containing at least twenty carbon atoms may be accomplished in various ways, such as by a Friedel-Crafts synthesis, using a halogenated high molecular weight aliphatic hydrocarbon, such as chlorinated wax, or by reaction with unsaturated high molecular weight aliphatic compounds or higher alcohols in the presence of $H_2SO_4$ as a catalyst.

I have found the Friedel-Crafts type of alkylation reaction to be particularly adapted to the step of preparing the "wax"-substituted hydroxyaromatic acids described herein because it affords a convenient means of controlling the degree of alkylation or wax-substitution in obtaining the desired "phenolic ratio" for use in the preferred mineral oil compositions contemplated by this invention.

In this reaction an appropriate halogenated high molecular weight aliphatic compound or material such as a mono- or poly- chlorine-substituted aliphatic compound or material containing at least twenty carbon atoms, for example, chlorinated petroleum wax, is reacted with the desired hydroxyaromatic compound in the presence of a catalytic amount of aluminum chloride. Pure or substantially pure mono- or poly- chlorine-substituted aliphatic compounds satisfying the above requisites may be used. However, as will be readily understood by those skilled in the art, since it is usually very difficult to prepare or obtain high molecular weight aliphatic hydrocarbons in a pure or substantially pure state and since it is equally difficult to prepare the chlorine (or other halogen) substitution products of such hydrocarbons in a pure or substantially pure state, I prefer to employ a mixture of such hydrocarbons, such as a suitable petroleum fraction (special preference being given to petroleum wax of melting point not substantially less than about 120° F.), as the starting material, converting it into a mixture of different chlorine (or other halide) substitution products by any suitable method for use in the alkylation step.

As stated above, the Friedel-Crafts synthesis affords a convenient means of controlling the "degree of alkylation" of the product. This is accomplished by controlling: (a) the chlorination of the aliphatic hydrocarbon and (b) the reacting proportions of the chlorinated aliphatic hydrocarbon and the hydroxyaromatic compound used in the Friedel-Crafts reaction. As is well known to those skilled in the art, the replacement of nuclear hydrogen in the hydroxyaromatic compound with an aliphatic group is, in the Friedel-Crafts synthesis, effected by reaction of such nuclear hydrogen with chlorine in the chlorinated aliphatic compound, the substitution being effected with evolution of HCl. It will thus be seen that the number of chlorine substituents in a chlorinated aliphatic compound such as chlorwax corresponds to the number of valence bonds ($v$ in general Formula IV) which will be satisfied by or attached to hydroxyaromatic nuclei in the product of the reaction. For example, in a reaction where a quantity of pure monochlor-wax containing say three atomic proportions of chlorine is reacted with one molecular proportion of hydroxyaromatic compound, the resulting alkylated product, $R^v(T(OH)Y_b)_n$, is one in which $v$ and $n$ are equal to one and there are three aliphatic (wax) groups $R^v$ attached to one nucleus T. On the other hand, assuming a reaction in which a quantity of a pure trichlor-wax containing three atomic proportions of chlorine is reacted with one molecular proportion of hydroxyaromatic compound, the product would be one in which $v$ and $n$ of general Formula IV are each equal to three, and the solubilizing action of a single high molecular weight aliphatic (wax) group would be distributed among three nuclear hydroxyaromatic groups. It is due to this latter condition that I consider it preferable that the number of valences $v$ (in $R^v$ of Formulae IV, etc.) be maintained within the range of from one to four hereinabove specified for the substituted hydroxyaromatic acids which are preferred for use as multifunctional oil-improving agents. In other words, it appears that the required oil-solubilizing and oil-improving action of the wax or high molecular weight aliphatic substituent $R^v$ is not obtained with materials predominantly comprised of a compound or compounds $R^v(T(OH)(COOH)Y_b)_n$ (Formula IV) in which $v$ and $n$ are greater than four. Hence, for use in the Friedel-Crafts reaction to ultimately obtain the preferred compounds or compositions contemplated by this invention the chlorinated high molecular weight aliphatic material should be a compound, or should be predominantly comprised of compounds, in which the chlorine content is not greater than a tetrachlor compound.

As will be readily apparent to those skilled in the art, the chlorination of a high molecular weight aliphatic material such as a crystalline petroleum wax will normally or usually result in a mixture of mono- and poly- chloraliphatic hydrocarbon compounds. Consequently, the product of a Friedel-Crafts reaction between such chlorinated material and a hydroxyaromatic compound will be a mixture of different compounds corresponding to different values of $v$ and $n$ in the formula $R^v(T(OH)Y_b)_n$, and the final carboxylic acid salt derived therefrom according to the reaction of Equation (b) above will likewise be a mixture of compounds corresponding to different values of $n$ and $v$ in general Formula IV. It will be understood, therefore, that the specific values of $v$ and $n$ in general Formula IV, as well as the formula itself, will, in the event a chlorinated material such as chlorwax is used in the initial reaction, relate to the different specific compounds present in such a mixture which characterize it as a product of the present invention. However, in the case of a pure compound corresponding to general Formula IV or in a mixture thereof I have, as previously stated, discovered that for a compound or composition which satisfactorily dissolved in mineral oil to serve as a multifunctional improving agent, the ratio by weight of the hydroxyaromatic component $(T(OH))_n$ to the corresponding heavy alkyl (wax)-substituted hydroxyaromatic nucleus or component $(R^v(T(OH))_n)$ should not be greater than a critical maximum ratio which varies with the constituents and conditions of use, as discussed in detail hereinabove.

The above-mentioned ratio of hydroxyaromatic component to the corresponding wax-substituted hydroxyaromatic component $$\frac{(T(OH))_n}{R^v(T(OH))_n}$$

in which the hydroxyaromatic component is calculated as phenol and which is therefore herein referred to as the phenol content or "phenolic ratio," is usually calculated from the weight of the hydroxyaromatic compound used up in the alkylation reaction and from the total weight of alkylated compound resulting from such alkylation reaction, as will be readily understood by those skilled in the art.

For example, when the Friedel-Crafts synthesis is used for alkylation, the high molecular weight aliphatic hydrocarbon material (wax) is first chlorinated until the weight of chlorine absorbed indicates that the average composition of the chlorinated product corresponds roughly to say a dichloraliphatic hydrocarbon. Such a product will, of course, contain some mono- and tri- chlor compounds and probably some tetrachlor compounds. The reacting proportions (based upon atomic proportions of chlorine to one mole of hydroxyaromatic cmpound) are then selected so that the theoretical product of the Friedel-Crafts reaction will give the approximate phenolic ratio desired. After the Friedel-Crafts reaction and purification of the product the weight of aliphatic material in the chlorinated aliphatic starting material is subtracted from the weight of the alkylated or aliphatic-substituted product to obtain the weight of hydroxyaromatic material $((T(OH))_n)$ actually combined or used up in the alkylation synthesis. From this value and the weight of the alkylated (wax-substituted) product $(R^v(T(OH))_n)$ the phenolic ratio or phenol content can be readily calculated. If there are other substituents $(Y_b)$ on the hydroxyaromatic nucleus in addition to the mono- or poly-valent heavy alkyl (wax) groups $(R^v)$, a deduction should be made for them before calculating the phenolic ratio, an operation which will be apparent to those skilled in the art.

In the foregoing description of the Friedel-Crafts alkylation reaction I have referred to a hydroxyaromatic compound as a starting material. This same reaction may be used with an alkyl-aryl ether or an aralkyl-aryl ether which undergoes a substantial rearrangement during Friedel-Crafts alkylation to form an alkylated hydroxyaromatic compound in which the alkyl group of the ether replaces one of the nuclear hydrogen atoms.

In the vent it is desired to obtain a product $R^v(T(OH)(COOH)Y_b)_n$ which contains an alkoxy group as the substituent $Y_b$, it is preferable that the alkylation be effected with a hydroxyaromatic compound containing such alkoxy or aroxy group as a substituent and a high molecular weight unsaturated aliphatic hydrocarbon of carbon chain length of twenty or more carbon atoms (such as eicosylene, cerotene, melene, etc.) or a higher alcohol of chain length of twenty or more carbon atoms (such as ceryl alcohol, myricyl alcohol, etc.) using $H_2SO_4$ as a catalyst. By this procedure, the hydroxyaromatic ether can be alkylated without substantial rearrangement taking place. As an alternative procedure, polyhydric phenols can be alkylated by reaction with higher alcohols or high molecular weight unsaturates or by Friedel-Crafts reaction followed by substitution of one hydroxyl hydrogen with a low molecular weight alkyl group. In carrying out this latter procedure, the alkylated polyhydric phenol is treated with an alkali alcoholate to introduce alkali metal into one OH group followed by treating with the desired alkyl halide, whereby the substitution to provide the alkoxy group is effected.

When it is desired to obtain a nitro or amino group as the substituent "$Y_b$" in general Formula IV, the hydroxy-aromatic compounds are alkylated or wax-substituted when free of nitro or amino groups, and such alkylation is followed by nitration of the alkylated compound to introduce the nitro substituent. The amino group can be obtained by reduction of the nitro group.

The following description illustrates a preferred procedure which may be followed in synthesizing the wax-substituted hydroxyaromatic carboxylic acids contemplated by this invention. The compounds or products obtained from the synthesis described below fall into that class or group of compositions hereinabove referred to as "preferred" because of their oil-solubility or their multifunctional activity when blended with mineral oil fractions. As will be apparent to those skilled in the art, compounds or compositions having a combined phenol content in excess of that necessary for oil-miscibility may be readily obtained by using a chlorinated wax having a chlorine content substantially higher than that given in the example below or by changing the ratio of the reactants (chlorwax and phenolic compound).

PREPARATION OF WAX-SUBSTITUTED PHENOL CARBOXYLIC ACID (1) *Alkylation of phenol*

A paraffin wax melting at approximately 120° F. and predominantly comprised of compounds having at least twenty carbon atoms in their molecules is melted and heated to about 200° F., after which chlorine is bubbled therethrough until the wax has absorbed from sixteen per cent to twenty per cent of chlorine, such a product having an average composition between a monochlor wax and a dichlor wax or corresponding roughly to a dichlor wax. Preferably the chlorination is continued until about one-fifth the weight of the "chlorwax" formed is chlorine. A quantity of chlorwax thus obtained, containing three atomic proportions of chlorine, is heated to a temperature varying from just above its melting point to not over 150° F., and one mole of phenol ($C_6H_5OH$) is admixed therewith. The mixture is heated to about 150° F., and a quantity of anhydrous aluminum chloride corresponding to about three per cent of the weight of chlorwax in the mixture is slowly added to the mixture with active stirring. The rate of addition of the aluminum chloride should be sufficiently slow to avoid violent foaming, and during such addition the temperature should be held at about 150° F. After the aluminum chloride has been added, the temperature of the mixture may be increased slowly over a period of from fifteen to twenty-five minutes to a temperature of about 250° F. and then may be more slowly increased to about 300° F. or 350° F. To control the evolution of HCl gas the temperature of the mixture is preferably raised from 250° F. to 300° F. or 350° F. at a rate of approximately one degree per minute, the whole heating operation occupying approximately two hours from the time of adding the aluminum chloride. If the emission of HCl gas has not ceased when the final temperature is reached, the mixture may be held at 300° F. or 350° F. for a short time to allow completion of the reaction. But, to avoid possible cracking of the wax, the mixture should preferably not be heated appreciably above 350° F., nor should it be held at that temperature for any extended length of time.

It is important to the formation of preferred oil-miscible products that all unreacted or non-alkylated hydroxy-aromatic material (phenol) remaining after the alkylation reaction be removed. Such removal can be effected generally by water-washing, but it is preferable to treat the water-washed product with super-heated steam, thereby insuring complete removal of the unreacted material and accomplishing the drying of the product in the same operation.

The wax-substituted phenol thus obtained may be characterized by the general formula $R^v(T(OH)Y_b)_n$, in which $R^v$ represents at least one heavy alkyl group or radical characteristic of paraffin wax having a valence $v$ of from one to four; T represents a monocyclic aromatic nucleus; $Y_b$ represents residual hydrogen, $b$ being a number corresponding to the number of valence bonds on the nucleus T not satisfied by $R^v$ and (OH); and $n$ is a number from one to four corresponding to the valences $v$ on the aliphatic group or groups $R^v$ which are satisfied by the nuclear group or groups $T(OH)Y_b$. At this step of the process, $b$ in the above general formula should always be at least one, since residual hydrogen in the nucleus is important to the carboxylation step to be hereinafter described.

A wax-substituted phenol prepared according to the above procedure, in which a quantity of chlorwax containing three atomic proportions of chlorine (twenty per cent chlorine in the chlorwax) is reacted with one mole of phenol, may, for brevity herein, be designated as "wax-phenol (3–20)." Parenthetical expressions of this type (A—B) will be used hereinafter in connection with the alkylated hydroxyaromatic compounds to designate (A) the number of atomic proportions of chlorine in chloraliphatic material (chlorwax) reacted with one mole of hydroxy-aromatic compound in the Friedel-Crafts reaction, and (B) the chlorine content of the chloraliphatic material (chlorwax). In the above example A=3 and B=20. This same designation will also apply to the salts of the carboxylic acids derived from these alkylated hydroxyaromatic compounds and to the acids obtained from the salts.

Wax-phenol (3–20) as obtained by the above procedure had a phenol content or a "phenolic ration" of about sixteen per cent. My research indicates that this phenolic ratio of sixteen per cent may be considered as representing about the maximum for satisfactory miscibility in viscous oils of an "alkylated hydroxyaromatic carboxylic acid" in which the alkyl substituent is derived from petroleum wax and the hydroxyaromatic constituent is derived from phenol ($C_6H_5OH$). Effective oil-improving agents can, however, be obtained from wax-phenol (3-16) in which the phenol content or phenolic ratio is in the neighborhood of thirteen per cent; also from wax-phenol (4-20).

The lower phenol content obtained from wax-phenol (3-16), for example, in which the chlorine content of the wax was sixteen per cent instead of twenty per cent is due to the lower proportions of polychlor-substituted compounds in the chlorwax resulting in a smaller proportion of compounds $R^v(T(OH)Y_b)_n$ in which $v$ is greater than one ($R^v$ polyvalent) or a larger proportion of such compounds in which $R^v$ is polyvalent but $c$ is one or more. Also, as the chlorine content of the chlorwax is decreased, the Friedel-Crafts reaction undoubtedly results in the formation of an increased proportion of compounds $$R^v(T(OH)Y_b)_n$$

in which $R^v$ is more than one monovalent wax group ($v$ and $n=1$).

(2) Formation of wax-substituted alkali or alkaline earth metal phenate

As an example of this step in the preparation of my oil-improving agents, wax-substituted sodium phenate can be prepared by the reaction of wax-phenol with metallic sodium in the presence of a non-oxidizing gas. The reaction mixture is heated at 500° F. during a two-hour period with rapid stirring to produce finely divided sodium and thereby accelerate the reaction. The proportions of reactants which were used in preparing a wax-substituted alkali metal phenate according to the above procedure were:

|  | Grams |
|---|---|
| Wax-phenol (13.2% combined phenol content) | 500 |
| Sodium or equivalent amount of potassium | 16 |

Wax-substituted phenates of the alkali and alkaline earth metals may also be prepared by reacting a wax-phenol with the desired alcoholate or alkyl metal oxide of an alkali or alkaline earth metal. For this purpose anhydrous alcohols such as amyl or lower molecular weight alcohols are the most suitable for use in preparing the alkyl metal oxides. As an example, 500 grams of wax-phenol (3-16) of 13.2 per cent combined phenol content were reacted with sixteen grams of sodium in the form of the ethyl sodium oxide by heating the mixture to about 300° F. during a one-hour period and allowing the alcohol released in the reaction to distill off, thereby obtaining the wax-substituted sodium phenate as the final product.

(3) Carboxylation to form alkali or alkaline earth metal salt of wax-phenol carboxylic acid A product of the foregoing step, such as the wax-substituted sodium phenate, is heated to a temperature of about 350° F. with stirring, and $CO_2$ is introduced at a rate sufficient to maintain this temperature. The pressure is gradually raised to about 500 pounds per square inch to complete the reaction at this temperature during a two-hour period. The reaction may be illustrated with unsubstituted sodium phenate by the following equations:

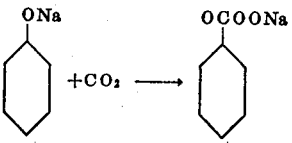

By rearrangement the carboxy group is transferred to the ring, giving the sodium salt of the phenol carboxylic acid:

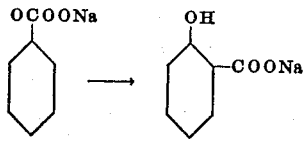

Other carboxylating reactions may be used in this step of the process, such as the reaction of the alkali metal wax-phenate with carbonyl chloride or carbon tetrachloride; but since the salt formed in the presence of $CO_2$ is obtained in high yield and in a pure state, this is the preferred carboxylation procedure. Although pressures in the neighborhood of 500 pounds per square inch are mentioned above in the description of the preferred carboxylation procedure, it may under certain circumstances be more desirable to use lower pressures or even to effect the carboxylation at atmospheric pressure.

Because of the high viscosity of the mixture it is advantageous to dilute the wax-substituted phenol initially with one or two parts of mineral oil. When a diluent has been used, the mixture can be stirred more readily, making it suitable to introduce the $CO_2$ at a lower temperature. By introducing the $CO_2$ under pressure at room temperature and gradually raising the mixture to 350° F. the temperature can be more readily controlled. When $CO_2$ is introduced under pressure at 350° F., rapid changes in viscosity occur, making it more difficult to control the temperature of the reaction mixture. However, $CO_2$ can be introduced under low pressure at 350° F., then gradually increasing the $CO_2$ to the desired pressure without causing difficulty in temperature control.

The product of this step, where the starting material was wax-substituted sodium phenate, is the sodium salt of wax-substituted phenol carboxylic acid.

(4) Formation of wax-substituted phenol carboxylic acid

The wax-substituted phenolic acid is obtained from the alkali or alkaline earth metal salt, such as the sodium salt of the foregoing step, by reacting with a mineral acid, such as dilute hydrochloric acid, in sufficient amount to neutralize the salt of the organic acid. Purification of the wax-substituted phenol carboxylic acid is then carried out by water-washing until the extract is neutral, followed by removal of any entrained water by distillation.

WAX-NAPHTHOL CARBOXYLIC ACIDS

The substituted acids of naphthol can be obtained by following the same general procedure described above for phenol. Oil-miscible wax-substituted carboxylic acids of the naphthols (alpha and beta) can be obtained from a wax-naphthol (3-18).

The substituted hydroxyaromatic carboxylic acids obtained by the exemplary procedures described above are, as the result of their relatively low "phenolic ratio" or combined phenol content, all oil-miscible or oil-soluble products. Although products of this type are designated herein as preferred, because of their multifunctional oil-improving properties, it is again emphasized that the invention is not limited to wax-substituted hydroxyaromatic acids which are oil-soluble but is inclusive of this entire field of products irrespective of oil-solubility. As has been previously stated, this entire class of compounds or compositions possesses valuable properties outside of the petroleum industry as intermediaries in the production of resins. Furthermore, as the phenol content is increased beyond the limits necessary for mineral oil-miscibility, the products lose their waxy characteristics and become rubber-like in character and show definite promise as rubber substitutes without any substantial amount of additional treatment.

Compounds or compositions of both the oil-miscible and non-miscible types have been prepared, and of the oil-miscible products synthesized all have been tested as additive agents for viscous mineral oils and have been found to be of multifunctional activity, improving the pour point and viscosity index and inhibiting oxidation of viscous mineral oil fractions. The following list is illustrative of the various oil-miscible wax-substituted hydroxyaromatic acids which I have prepared and tested to demonstrate their value as additive agents for viscous mineral oils:

TABLE

Wax-phenol carboxylic acid (3–20)
Wax-phenol carboxylic acid (4–20)
Wax-phenol carboxylic acid (3–16)
Wax-beta naphthol carboxylic acid (3–18)

I claim:

1. As a new composition of matter, an alkyl-substituted hydroxyaromatic carboxylic acid in which the alkyl substituent is attached to the aryl nucleus and is derived from an aliphatic material having at least twenty carbon atoms, said composition being miscible with mineral oil and possessing the property of improving the pour point and viscosity index and inhibiting oxidation of a viscous mineral oil fraction when admixed therewith.

2. As a new composition of matter, an alkyl-substituted phenol carboxylic acid in which the alkyl substituent is attached to the aryl nucleus and is derived from an aliphatic material having at least twenty carbon atoms, said composition being miscible with mineral oil and possessing the property of improving the pour point and viscosity index and inhibiting oxidation of a viscous mineral oil fraction when admixed therewith.

3. As a new composition of matter, an alkyl-substituted naphthol carboxylic acid in which the alkyl substituent is attached to the aryl nucleus and is derived from an aliphatic material having at least twenty carbon atoms, said composition being miscible with mineral oil and possessing the property of improving the pour point and viscosity index and inhibiting oxidation of a viscous mineral oil fraction when admixed therewith.

4. As a new composition of matter, an alkyl-substituted hydroxyaromatic carboxylic acid in which the alkyl substituent contains at least twenty carbon atoms and is attached to the aryl nucleus.

5. As a new composition of matter, an alkyl-substituted phenol carboxylic acid in which the alkyl substituent contains at least twenty carbon atoms and is attached to the aryl nucleus.

6. As a new composition of matter, an alkyl-substituted naphthol carboxylic acid in which the alkyl substituent contains at least twenty carbon atoms and is attached to the aryl nucleus.

7. An alkyl-substituted phenol carboxylic acid in which the ratio of the phenol content to alkylated phenol content does not exceed twenty per cent.

8. The method of preparing an alkyl-substituted hydroxyaromatic carboxylic acid which comprises: alkylating an hydroxyaromatic compound with an alkyl group containing at least twenty carbon atoms; substituting the hydrogen of the hydroxy group with a metal selected from the group consisting of alkali and alkaline earth metals; converting the metal aryl oxide thus obtained to the corresponding metal salt of the corresponding hydroxyaromatic carboxylic acid by treatment with carbon dioxide; and liberating the corresponding alkyl-substituted hydroxyaromatic acid by treating said salt with an inorganic acid.

9. The method of preparing an alkyl-substituted hydroxyaromatic carboxylic acid which comprises alkylating an hydroxyaromatic compound with an alkyl group containing at least twenty carbon atoms; substituting the hydrogen of the hydroxy group with an alkali metal by treatment with finely divided alkali metal at elevated temperature; converting the alkali metal aryl oxide thus obtained into the alkali metal salt of the corresponding hydroxyaromatic carboxylic acid by treatment wtih carbon dioxide; and liberating the corresponding alkyl-substituted hydroxyaromatic acid by treating said salt with an inorganic acid.

10. The method of preparing an alkyl-substituted hydroxyaromatic carboxylic acid which comprises: alkylating an hydroxyaromatic compound with an alkyl group containing at least twenty carbon atoms; substituting the hydrogen of the hydroxy group with a metal selected from the group consisting of alkali and alkaline earth metals by treating said alkyl-substituted hydroxyaromatic compound at elevated temperature with an alcoholate of said metal; converting the metal aryl oxide thus obtained to the corresponding metal salt of the corresponding hydroxyaromatic acid by treatment with carbon dioxide; and liberating the corresponding alkyl-substituted hydroxyaromatic acid by treating said salt with an inorganic acid.

ORLAND M. REIFF.